(12) United States Patent
Bonanno et al.

(10) Patent No.: US 10,394,559 B2
(45) Date of Patent: Aug. 27, 2019

(54) BRANCH PREDICTOR SEARCH QUALIFICATION USING STREAM LENGTH PREDICTION

(71) Applicant: International Business Machines Corporation, Armonk, NY (US)

(72) Inventors: James J. Bonanno, Wappingers Falls, NY (US); Michael J. Cadigan, Jr., Poughkeepsie, NY (US); Adam B. Collura, Hopewell Junction, NY (US); Daniel Lipetz, Linden, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

(21) Appl. No.: 15/376,847

(22) Filed: Dec. 13, 2016

(65) Prior Publication Data
US 2018/0165094 A1    Jun. 14, 2018

(51) Int. Cl.
*G06F 9/30*      (2018.01)
*G06F 9/38*      (2018.01)

(52) U.S. Cl.
CPC ........ *G06F 9/30058* (2013.01); *G06F 9/3848* (2013.01)

(58) Field of Classification Search
None
See application file for complete search history.

(56) References Cited

U.S. PATENT DOCUMENTS

| | | | |
|---|---|---|---|
| 5,507,028 A * | 4/1996 | Liu | G06F 9/3806 712/207 |
| 5,574,871 A | 11/1996 | Hoyt et al. | |
| 6,092,187 A | 7/2000 | Killian | |
| 6,185,675 B1 * | 2/2001 | Kranich | G06F 9/3804 711/125 |
| 6,263,427 B1 | 7/2001 | Cummins et al. | |
| 6,339,822 B1 * | 1/2002 | Miller | G06F 9/30149 711/125 |
| 7,082,520 B2 | 7/2006 | Bonanno et al. | |
| 9,235,419 B2 | 1/2016 | Bonanno et al. | |
| 9,280,351 B2 | 3/2016 | Bonanno et al. | |
| 9,298,465 B2 | 3/2016 | Bonanno et al. | |

(Continued)

OTHER PUBLICATIONS

International Application No. PCT/EP2017/081131 International Search Report and Written Opinion dated Mar. 5, 2018, 11 pages.

(Continued)

*Primary Examiner* — George Giroux
(74) *Attorney, Agent, or Firm* — Cantor Colburn LLP; William Kinnaman (57) ABSTRACT

A computer-implemented method includes determining, by a stream-based index accelerator predictor of a processor, a predicted stream length between an instruction address and a taken branch ending an instruction stream. A first-level branch predictor of a hierarchical asynchronous lookahead branch predictor of the processor is searched for a branch prediction in one or more entries in a search range bounded by the instruction address and the predicted stream length. A search of a second-level branch predictor of the hierarchical asynchronous lookahead branch predictor is triggered based on failing to locate the branch prediction in the search range.

15 Claims, 7 Drawing Sheets

(56) References Cited

U.S. PATENT DOCUMENTS

| | | | |
|---|---|---|---|
| 2009/0217003 A1* | 8/2009 | Sonnelitter, III | ... G06F 9/30058 |
| | | | 712/205 |
| 2009/0217016 A1 | 8/2009 | Bonanno et al. | |
| 2013/0339695 A1 | 12/2013 | Bonanno et al. | |
| 2015/0019848 A1 | 1/2015 | Bonanno et al. | |
| 2015/0121050 A1 | 4/2015 | Williams et al. | |
| 2017/0046159 A1* | 2/2017 | Priyadarshi | ........... G06F 9/3804 |

OTHER PUBLICATIONS

A. Seznec, "The L-TAGE Branch predictor," Journal of Instruction Level Parallelism 9, May 2007, pp. 1-13.
D. Jimenez, et al., "Dynamic Branch Prediction with Perceptrons," The Seventh International Symposium on High-Performance Computer Architecture, Jan. 2001, 10 pages.
Lee, et al., "Branch prediction strategies and branch target buffer design," Computer, vol. 17, Issue 1, Jan. 1984, 17 pages.
McFarling, Combining Branch Predictors, Technical Report TN-36m, Digital Western Research Laboratory, Jun. 1993, 29 pages.

* cited by examiner

BRANCH PREDICTOR SEARCH QUALIFICATION USING STREAM LENGTH PREDICTION

BACKGROUND

The present disclosure relates to the field of microprocessor design, and more specifically, to branch predictor search qualification using stream length prediction.

Branch prediction is a performance-critical component of a pipelined high frequency microprocessor. It is used to predict the direction (taken vs. not taken) and the target address of each branch instruction. This is beneficial because it allows processing to continue along a branch's predicted path rather than having to wait for the outcome of the branch to be determined. A penalty is incurred if a branch is predicted incorrectly. A pipelined branch predictor takes several cycles to make a prediction.

Traditionally, branch prediction is used to steer the flow of instructions down a processor pipeline along the most likely path of code to be executed within a program. Branch prediction uses historical information to predict whether or not a given branch will be taken or not taken, such as predicting which portion of code included in an IF-THEN-ELSE structure will be executed based on which portion of code was executed in the past. The branch that is expected to be the first taken branch is then fetched and speculatively executed. If it is later determined that the prediction was wrong, then the speculatively executed or partially executed instructions are discarded and the pipeline starts over with the instruction proceeding to branch with the correct branch path, incurring a delay between the branch and the next instruction to be executed.

Access times of structures used to provide branch predictions limit their capacity. Hierarchical branch predictors can provide a system with larger capacity. In such designs, absence of branch predictions from multiple consecutive searches of first level predictors is typically used as an indication of a "level 1 miss" that can be used to trigger a search and bulk transfer of multiple branches in the vicinity of the "level 1 miss" from a level 2 structure into the level 1 structure. However, absence of predictions can either be due to capacity problems, in which case it is beneficial to access the second level of the hierarchy, or absence of predictions can be due to no branch instructions being located in the section of code searched. An asynchronous lookahead branch predictor cannot typically distinguish between these two cases. Therefore, it would be advantageous to improve the search and transfer process within a hierarchical branch predictor.

SUMMARY

According to an embodiment, a computer-implemented method includes determining, by a stream-based index accelerator predictor of a processor, a predicted stream length between an instruction address and a taken branch ending an instruction stream. A first-level branch predictor of a hierarchical asynchronous lookahead branch predictor of the processor is searched for a branch prediction in one or more entries in a search range bounded by the instruction address and the predicted stream length. A search of a second-level branch predictor of the hierarchical asynchronous lookahead branch predictor is triggered based on failing to locate the branch prediction in the search range.

According to other embodiments, a system includes a stream-based index accelerator predictor of a processor operable to determine a predicted stream length between an instruction address and a taken branch ending an instruction stream. The system also includes a hierarchical asynchronous lookahead branch predictor of the processor comprising a first-level branch predictor and a second-level branch predictor. The hierarchical asynchronous lookahead branch predictor is operable to search the first-level branch predictor for a branch prediction in one or more entries in a search range bounded by the instruction address and the predicted stream length and trigger a search of the second-level branch predictor based on failing to locate the branch prediction in the search range.

According to yet other embodiments, a computer program product includes a computer readable storage medium having program instructions embodied therewith, where the computer readable storage medium is not a transitory signal per se. The program instructions are executable by a processor to cause the processor to perform a method including determining, by a stream-based index accelerator predictor of the processor, a predicted stream length between an instruction address and a taken branch ending an instruction stream. A first-level branch predictor of a hierarchical asynchronous lookahead branch predictor of the processor is searched for a branch prediction in one or more entries in a search range bounded by the instruction address and the predicted stream length. A search of a second-level branch predictor of the hierarchical asynchronous lookahead branch predictor is triggered based on failing to locate the branch prediction in the search range.

BRIEF DESCRIPTION OF THE DRAWINGS

The subject matter is particularly pointed out and distinctly claimed in the claims at the conclusion of the specification. The forgoing and other features, and advantages of embodiments are apparent from the following detailed description taken in conjunction with the accompanying drawings in which:

DETAILED DESCRIPTION

Embodiments use a hierarchical asynchronous lookahead branch predictor of a processor for a branch prediction process in combination with a stream-based branch prediction index accelerator (SPRED). A hierarchical asynchronous lookahead branch predictor includes a first-level branch predictor and a second-level branch predictor that is searched upon failing to locate a branch in the first-level branch predictor. The first-level branch predictor and the second-level branch predictor can each include one or more branch target buffers (BTBs) with different sizes and performance characteristics. A BTB is a structure that stores branch, target information, and optionally other prediction support information.

Asynchronous lookahead branch prediction is done asynchronously from a processor pipeline which begins with instruction fetching. Upon being restarted at a specified instruction address at the same time frame as instruction fetching, branch prediction independently searches the first-level branch predictor for the first branch at or after the restart address. Upon finding a branch, branch prediction logic reports it to instruction fetching logic and to pipeline logic to allow eventual correlation between branch predictions and instructions being decoded. Independently from the rest of the pipeline, the branch prediction logic re-indexes itself with the predicted target address of a predicted taken branch. For a predicted not-taken branch, it continues searching sequentially. It then looks for the next branch. This process then repeats. Indexing branch predictors, reading content from them, and determining whether or not there is a predicted taken branch and, if so, its target address, can take multiple processor cycles in modern high frequency designs.

The first-level branch predictor is generally indexed using an instruction address and is incremented by a certain amount to continue searching sequentially for branches within a region of code. Each time the processor instruction stream is restarted, such as for a wrong branch, searching starts and a new stream is started. Therefore, each predicted taken branch starts a new stream. Embodiments utilize stream length information from the SPRED to determine how to act on a potential first-level branch predictor miss. Full action, such as a full search of the second-level branch predictor, can be prevented when the SPRED indicates that the instruction address of the taken branch prediction ending a current stream being searched is greater than the current search address, when that current search address is far enough beyond the start point that it would otherwise have been reported as a level-1 miss when no branch predictions are found. The miss can be accelerated when the SPRED predicted the stream end early but no branch was found (e.g., before a fixed miss limit).

Figure 1:
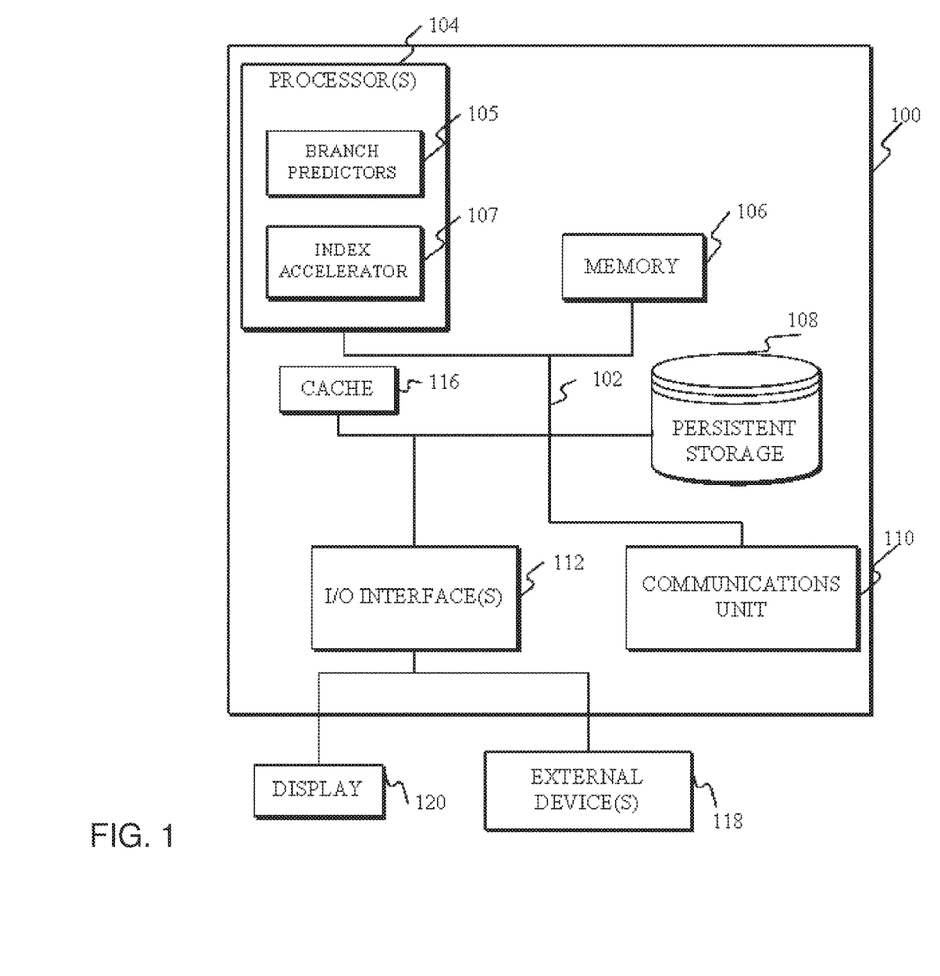
FIG. 1 is a block diagram of components of a computing device in accordance with an embodiment.

FIG. 1 depicts computer system 100, which is an example of a system that includes embodiments. Computer system 100 includes communications fabric 102, which provides communications between computer processor(s) 104 including branch predictors 105 and index accelerator 107, memory 106, persistent storage 108, communications unit 110, input/output (I/O) interface(s) 112, and cache 116. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Memory 106 and persistent storage 108 are computer readable storage media. In this embodiment, memory 106 includes random access memory (RAM). In general, memory 106 can include any suitable volatile or non-volatile computer readable storage media. Cache 116 is a fast memory that enhances the performance of processors 104 by holding recently accessed data and data near accessed data from memory 106. Cache 116 can be distributed within and/or external to processors 104 and may include instructions (e.g., Icache) and/or data (e.g., Dcache).

Program instructions and data used to practice embodiments may be stored in persistent storage 108 for execution by one or more of the respective processors 104 via cache 116 and one or more memories of memory 106. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Program instructions and data used to practice embodiments may be downloaded to persistent storage 108 through communications unit 110.

I/O interface(s) 112 allows for input and output of data with other devices that may be connected to each computer system. For example, I/O interface 112 may provide a connection to external devices 118 such as a keyboard, keypad, a touch screen, and/or some other suitable input device. External devices 118 can also include portable computer readable storage media such as, for example, thumb drives, portable optical or magnetic disks, and memory cards. Software and data used to practice embodiments of can be stored on such portable computer readable storage media and can be loaded onto persistent storage 108 via I/O interface(s) 112. I/O interface(s) 112 also connect to a display 120. Display 120 provides a mechanism to display data to a user and can be, for example, a computer monitor.

Branch predictors 105 and index accelerator 107 can include one or more sets of hardware logic components capable of making and storing predictions for the location of branches in an instruction stream. Example embodiments of the branch predictors 105 and index accelerator 107 are further described herein in reference to FIGS. 2-8.

Figure 2:
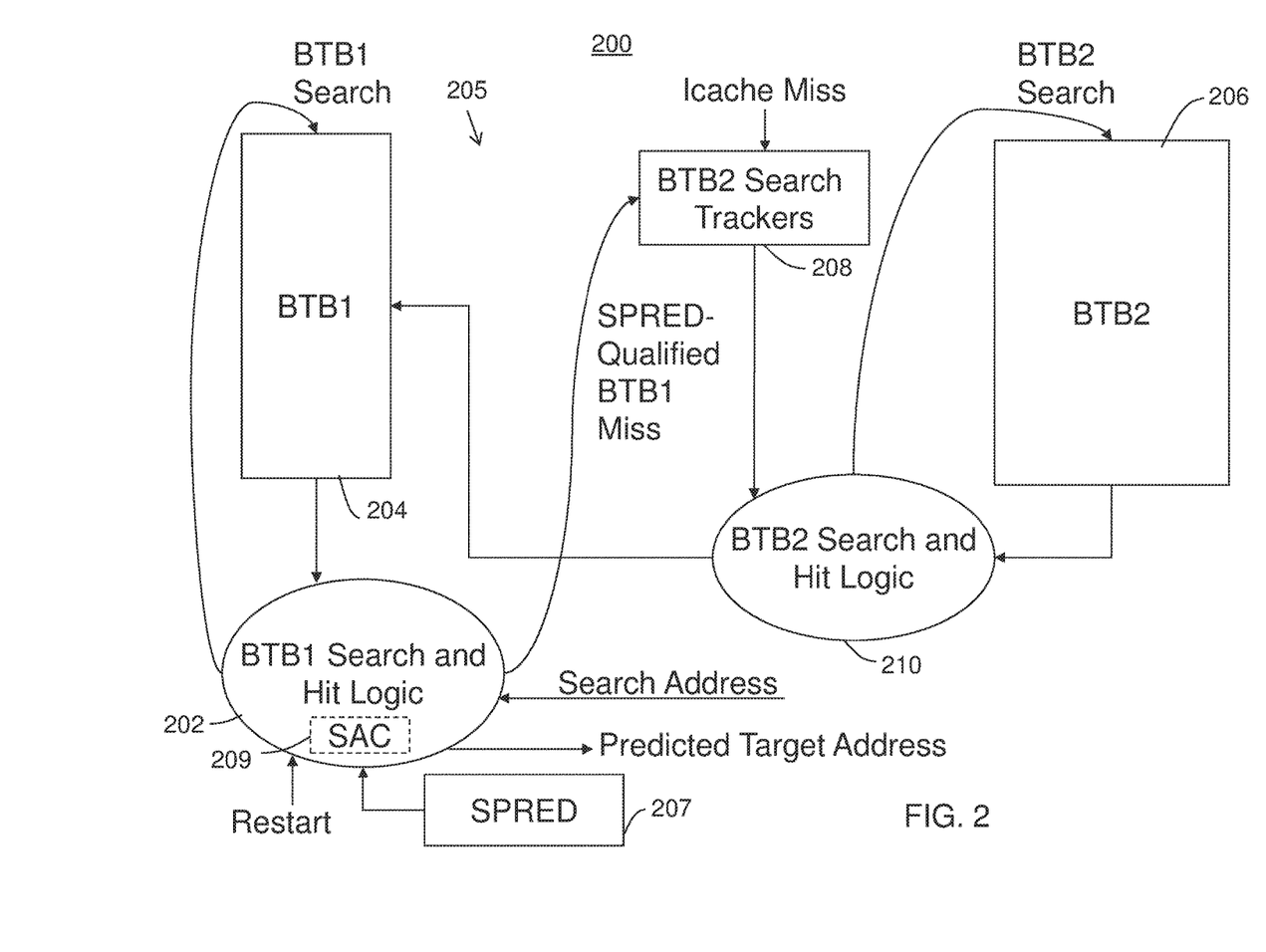
FIG. 2 is a block diagram of a system in accordance with an embodiment.

FIG. 2 depicts a system 200 including a hierarchical asynchronous lookahead branch predictor 205 as an embodiment of the branch predictors 105 of FIG. 1 and a SPRED 207 as an embodiment of the index accelerator 107 of FIG. 1. The example hierarchical asynchronous lookahead branch predictor 205 of FIG. 2 includes a first-level branch predictor (BTB1) 204, BTB1 search and hit logic 202, a second-level branch predictor (BTB2) 206, BTB2 search trackers 208, and BTB2 search and hit logic 210. The BTB1 search and hit logic 202 controls access and updates of BTB entries in the BTB1 204, while the BTB2 search and hit logic 210 controls access and updates of BTB entries in the BTB2 206. In an exemplary embodiment, BTB1 204 is a primary or first-level BTB, and BTB2 206 is a secondary or second-level BTB. BTB2 search trackers 208 can be configured as a filter for searching and controlling the bulk transfer of multiple BTB entries from the BTB2 206 based on a SPRED-qualified BTB1 miss. The SPRED-qualified BTB1 miss can be further limited by an instruction cache miss associated with a same region of memory. While the BTB1 search and hit logic 202, the SPRED 207, and the BTB2 search and hit logic 210 are depicted separately, it will be understood that they can be combined into a single logic block or further subdivided.

Figure 3:
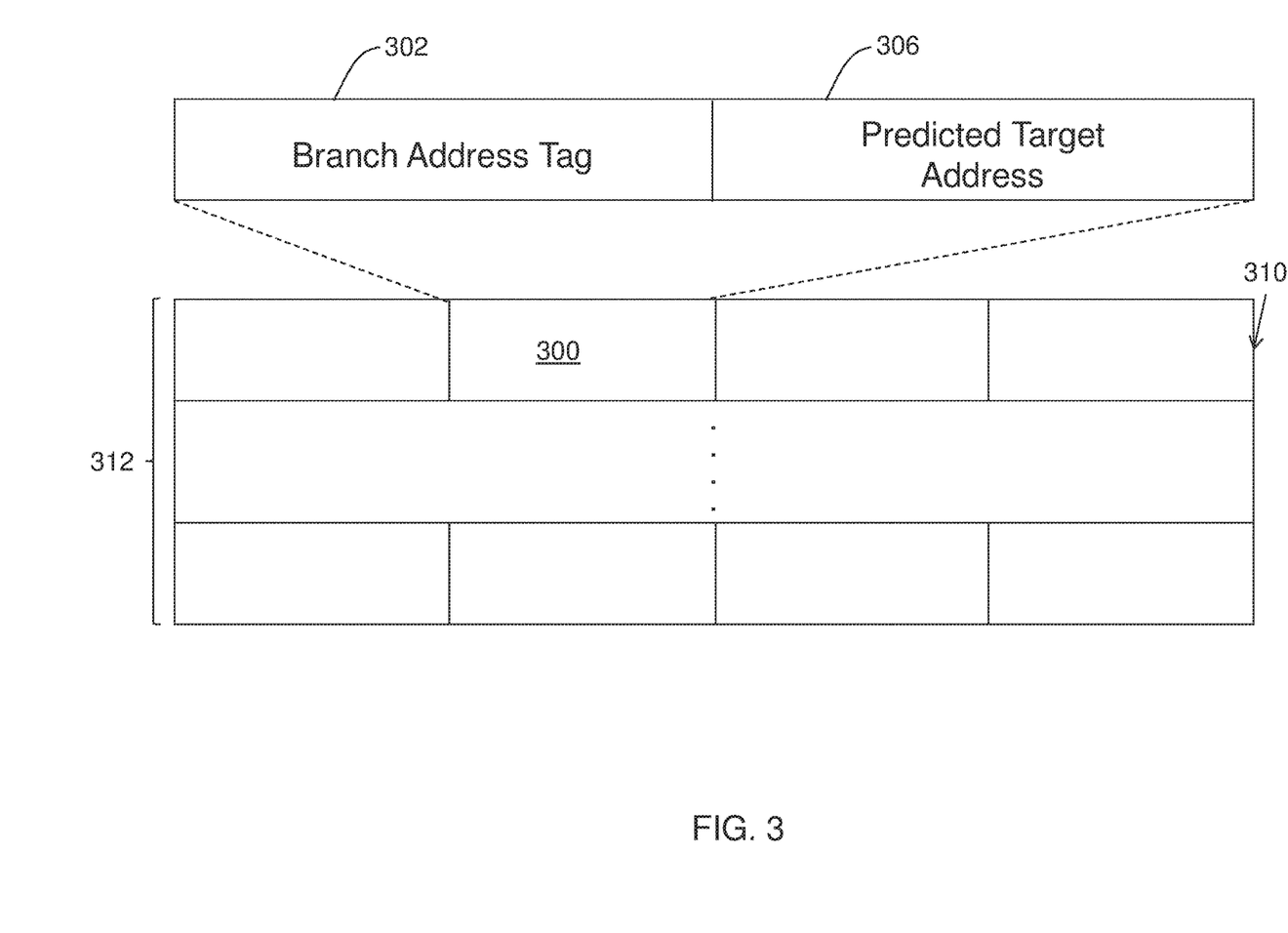
FIG. 3 depicts entries in a branch target buffer in accordance with an embodiment.

Each of the BTB1 204 and BTB2 206 is set associative, including multiple sets of BTB entries. The BTB2 206 is a higher level cache of branch prediction information. The capacity of the BTB2 206 is greater than the capacity of the BTB1 204 to store entries, and the BTB1 204 covers a larger or equal to instruction footprint than instruction cache of the cache 116 of FIG. 1. A general example of a BTB entry is depicted in FIG. 3 as BTB entry 300 (also referred to as entry 300), which includes a branch address tag 302 and a predicted target address 306. With continued reference to FIGS. 1-3, the branch address tag 302 is used to locate an entry within a BTB row 310, where each of the BTB1 204 and BTB2 206, of FIG. 2 can include multiple BTB rows 312 and multiple set associative BTB entries per BTB row 310. The BTB1 204 and BTB2 206 can have different numbers of BTB rows 312 and columns relative to each other. Each BTB entry 300 can include other branch prediction information (not depicted), such as a branch direction to indicate whether the associated branch was taken or not taken.

In an exemplary embodiment, a search address corresponding to a restart of instruction fetching in processors 104 of FIG. 1 is sent to the BTB1 search and hit logic 202 which thereafter operates asynchronously from instruction fetching until the next restart. When looking for branch predictions, the BTB1 204 is read and can provide a branch prediction if it contains an entry with a branch address tag 302 matching the search address. The BTB1 204 provides input to BTB1 search and hit logic 202 to determine whether a match or "hit" is located based on the search address. If a match is found, the BTB1 search and hit logic 202 outputs a predicted target address. If a match is not found, sequential searching of the BTB1 204 continues over a search range before declaring a BTB1 miss and taking further action through BTB2 search trackers 208.

The search range of the BTB1 204 can be established by the SPRED 207. In embodiments, the SPRED 207 determines a predicted stream length between an instruction address and a taken branch ending an instruction stream. The BTB1 204 is searched for a branch prediction in one or more entries 300 in the search range bounded by the instruction address and the predicted stream length. A search of the BTB2 206 can be triggered based on failing to locate the branch prediction in the search range.

In some embodiments, the BTB2 search trackers 208 can be omitted. In embodiments that include the BTB2 search trackers 208, BTB1 misses may be tracked on the granularity of BTB2 pages. For example, if a BTB2 bulk transfer granularity (page size) is 4 KB, then any qualified BTB1 miss in the same 4 KB page is considered the same page miss. If a search tracker in the BTB2 search trackers 208 is active for a BTB1 miss in a particular page, any subsequent misses in that same page are ignored while that search tracker is active and while that page address is identified as recently completed. Upon detecting a BTB1 miss that is a duplicate of an active search tracker in the BTB2 search trackers 208 that has an instruction cache miss validity indicator of valid (e.g., bit set to '1'), but the BTB1 miss validity indicator is invalid (e.g., bit set to '0'), then the associated BTB1 miss validity indicator of the search tracker can be set to valid (e.g., '1').

Independently from BTB1 misses, as instruction cache misses occur, they can be sent to the BTB2 search trackers 208. Each search tracker can also track instruction cache misses. Instruction cache misses can be tracked on the same page granularity as BTB2 bulk transfers, or a different instruction cache granularity. If the instruction cache miss address matches the address of a tracker active for a BTB1 miss (a BTB1 miss address), but not an instruction cache miss, the instruction cache miss validity indicator can be set valid (e.g., '1').

Active search trackers can be used to perform searches of the BTB2 206. In exemplary embodiments, whenever a search tracker is active for both a BTB1 miss and an instruction cache miss, a full page transfer can occur. All rows of the BTB2 206 within the page are searched, and hits are written into the BTB1 204. Search trackers that are active for both a BTB1 miss and instruction cache miss can remain active until the BTB2 bulk transfer completes.

The SPRED 207 can track an index to a row corresponding to the address of the first instruction received in an instruction stream and the information included in the current row of the SPRED 207 is read. In various embodiments, depending on the width of the address space, various numbers of unique instruction addresses may be present, and as a result different numbers of rows may be required for SPRED 207 in various embodiments. Generally, only a subset of bits of the instruction address for a given instruction is used to identify the row number in SPRED 207 which contains branch prediction data for the given instruction. For example, in an embodiment where 32-bit instruction addresses are used (including bits 0 through 31), each instruction address can be split into a left tag (L-tag) made up of the first 17 bits of the instruction address (bits 0 through 16), an index made up of the next 10 bits of the instruction address (bits 17 through 26), and a right tag (R-tag) made up of the final 5 bits of the instruction address (bits 27 through 31). In this embodiment, because only the ten bits of the instruction address used as the index are used to determine the row in SPRED 207 in which the branch prediction data is stored for that instruction, SPRED 207 includes 1024 rows. Further, in some embodiments SPRED 207 is designed to contain the same number of rows as BTB1 204 and be indexed based on the same 10 bits of the instruction address as BTB1 204. In other embodiments, BTB1 204 and SPRED 207 use different numbers of bits to determine which row in the respective tables contain the branch prediction information for that instruction. In these embodiments, it is possible for BTB1 204 and SPRED 207 to have different numbers of rows while still allowing for correct operation.

Data contained in a row of SPRED 207 corresponding to the current instruction can be read to determine if a branch is expected for the current instruction. It should be appreciated that one row of SPRED 207 can correspond to a large number of instruction addresses in embodiments where aliasing is used, and that in these embodiments multiple instruction addresses can correspond to the same row in SPRED 207. In one embodiment, the first bit of data stored in the current row of SPRED 207 contains a binary indication of whether or not a taken prediction is present in the corresponding row of BTB1 204. In this embodiment, the determination of whether or not a taken prediction is present in the corresponding row of BTB1 204 is made using an offset field indicating how many searches of the BTB1 204 need to be made before encountering the taken branch to end the stream.

The processor(s) 104 can identify the target address of the first taken branch prediction indicated in the currently selected row of SPRED 207. In some embodiments, an additional structure such as a changing target buffer (CTB)

may be used to predict the target address for the first taken prediction indicated by one or more rows of SPRED 207. In these embodiments, the target address of the first taken prediction may be omitted, and the indication of the column of BTB1 204 can be used to more easily identify the target address of the first taken prediction using the additional structure such as the CTB.

A prediction can be drawn from BTB1 204 simultaneously while a prediction is drawn from SPRED 207. The prediction drawn from SPRED 207 can be considered valid until confirmed or disputed by the prediction drawn from BTB1 204. In various embodiments, the bits of data included in SPRED 207 can be the bits of data used to re-index SPRED 207 to the target address of the prediction. In embodiments where more or fewer bits of data are used to re-index SPRED 207, the length of the number included in a given row of SPRED 207 can differ. Once the target address of the first taken branch prediction is identified, processor(s) 104 re-indexes SPRED 207 and BTB1 204 to the rows corresponding to the target address for the first taken branch prediction. Once SPRED 207 and BTB1 204 are re-indexed, processor(s) 104 re-starts the process of searching BTB1 204 and SPRED 207 for branch predictions at the new target address.

The processor(s) 104 can determine if there is more address space to search. If search logic, such as the BTB1 search and hit logic 202, decides that searching should stop, then branch prediction searching ends. A restart begins a new search stream in branch prediction logic. Once a restart occurs, processor 104 may keep searching sequentially for branches. In other aspects, processor 104 may also accelerate re-indexing whenever SPRED 207 finds an end of stream, so processor 104 redirects branch predictors 105 to start searching into a new stream. If a request for a restart is received with an instruction address following the previous instruction address, then processor 104 can continue searching the next sequential rows of BTB1 204 and SPRED 207 for predictions of the presence of branches. In general, the indexes of BTB1 204 and SPRED 207 can be incremented because the next row in BTB1 204 and SPRED 207 contains branch prediction information for the next sequential set of instructions present in the instruction stream.

The SPRED 207 can determine a predicted exit point or taken branch that ends a stream. For instance, at the start of stream 0, a start instruction address of 0x00 can be used to index into the SPRED 207, and output of the SPRED 207 can indicate the exit point is X locations/instructions from the start of stream 0. The output of SPRED 207 can be used to accelerate indexing into stream 1 once X locations/instructions were searched in stream 0. Indexing can advance with a start instruction address to produce an output of Y locations/instructions, indicating where the exit point of stream 1 resides, etc. With this approach, the SPRED 207 may only need to be read once per stream, with the starting search address of the stream (for example). An entry of the SPRED 207 can include information containing an offset to a predicted exit point as a predicted stream length between an instruction address and a taken branch ending an instruction stream.

In some embodiments, an accuracy counter 209 (i.e., a SPRED accuracy counter) is updated based on a number of times that the SPRED 207 correctly predicts the predicted stream length and the correct prediction is used. Use of the search range, as bounded by the instruction address and the predicted stream length, can be based on determining that the accuracy counter 209 is above an accuracy threshold. If the accuracy of the SPRED 207 is below an accuracy threshold, then the SPRED 207 can be deemed inaccurate, resulting in disabling use of the search range and enabling use of a default search depth based on determining that the accuracy counter 209 is below the accuracy threshold. For instance, a default search range can be set to a predetermined value, such as searching for three entries before declaring a miss. In contrast, the SPRED 207 can set a search range that is greater or lesser than the default search range based on a predicted stream length between an instruction address and a taken branch ending the instruction stream.

Figure 4:
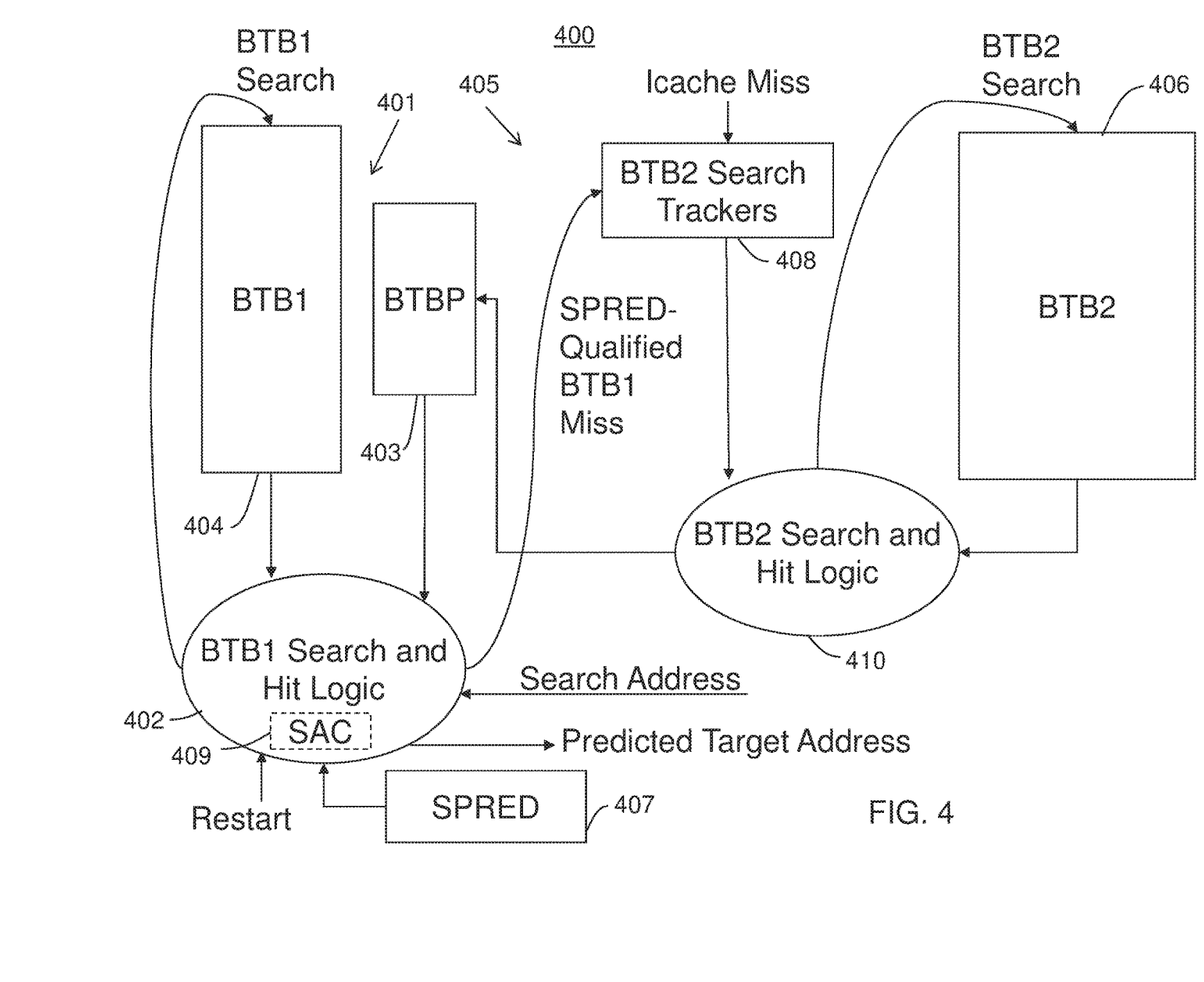
FIG. 4 is a block diagram of another system in accordance with an embodiment.

FIG. 4 depicts a system 400 including a hierarchical asynchronous lookahead branch predictor 405 as an embodiment of the branch predictors 105 of FIG. 1 and a SPRED 407 as an embodiment of the index accelerator 107 of FIG. 1. The example hierarchical asynchronous lookahead branch predictor 405 of FIG. 4 includes a first-level branch predictor 401 with BTB1 404 and a branch target buffer preload table (BTBP) 403, BTB1 search and hit logic 402, a second-level branch predictor (BTB2) 406, BTB2 search trackers 408, and BTB2 search and hit logic 410.

The BTBP 403 can be a small BTB that is searched in parallel with a larger main BTB (BTB1 404) to predict branch instructions' targets, and optionally direction. Because the BTB1 404 is larger, it can be implemented with large SRAM arrays which may have a limited number of read and write ports (usually 1 or 2 reads and a single write port with the restriction that it is not possible to read and write to the same bank in the same cycle). However, since the BTBP 403 is much smaller than the BTB1 404, it can be implemented with SRAM register files, for example. The BTBP 403 may have many read and write ports that can be used simultaneously. Therefore, multiple sources of branch prediction information can take advantage of the BTBP 403 write bandwidth by being written to the BTBP 403 first. The BTBP 403 may be constructed to act as a filter for the BTB1 404, where the BTB1 404 receives branch prediction information from the BTBP 403. In exemplary embodiments, the BTBP 403 promotes branches that are considered the most useful (e.g., at least one search hit) from the BTBP 403 into the BTB1 404. The BTBP 403 can also serve as a set associative victim BTB cache by storing branch prediction information recently evicted from the BTB1 404. The BTBP 403 can support software preload installs and may interface with other structures, such as the BTB2 406.

Similar to the embodiment of FIG. 2, the BTB1 search and hit logic 402 controls access and updates of BTB entries in the BTB1 404 (and optionally BTBP 403), while the BTB2 search and hit logic 410 controls access and updates of BTB entries in the BTB2 406. In an exemplary embodiment, BTBP 403 and BTB1 404 collectively form the first-level branch predictor 401, and BTB2 406 is a secondary or second-level BTB. BTB2 search trackers 408 can be configured as a filter for searching and controlling the bulk transfer of BTB entries from the BTB2 406 to the BTBP 403 based on a SPRED-qualified BTB1 miss. The SPRED-qualified BTB1 miss can be further limited by an instruction cache miss associated with a same region of memory. While the BTB1 search and hit logic 402, the SPRED 407, and the BTB2 search and hit logic 410 are depicted separately, it will be understood that they can be combined into a single logic block or further subdivided. Rather than transferring a plurality of branches from the BTB2 406 directly to the BTB1 404, the BTB2 search and hit logic 410 can transfer branches to the BTBP 403. Branches located in the BTBP 403 may be transferred to the BTB1 404 upon identifying a "hit" of a branch within the BTBP 403.

In some embodiments, the BTB1 404 and BTBP 403 are searched in parallel with a search range defined by the SPRED 407. In other embodiments, the search range defined by the SPRED 407 limits searches of the BTB1 404 but does not limit the search range of the BTBP 403. The BTB1 404 and BTB2 406 can be structured similar to the BTB1 204 and BTB2 206 of FIG. 2. The SPRED 407, BTB2 search trackers 408, accuracy counter 409, and BTB2 search and hit logic 410 can operate similarly to the SPRED 207, BTB2 search trackers 208, accuracy counter 209, and BTB2 search and hit logic 210 of FIG. 2.

Figure 5:
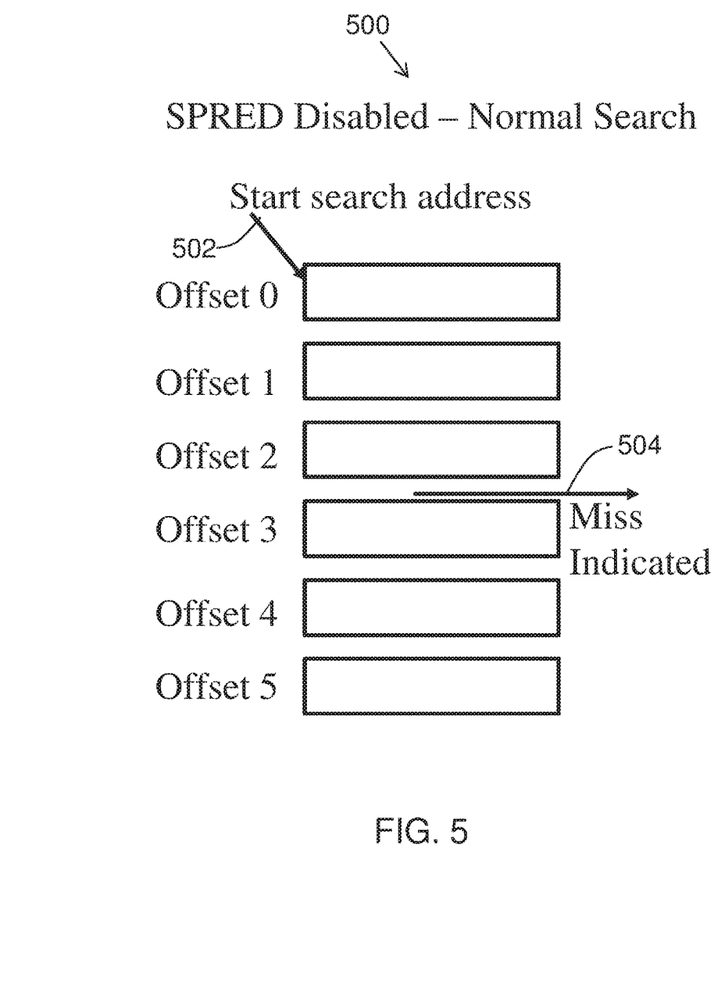
FIG. 5 depicts a branch predictor search in accordance with an embodiment.

FIGS. 5-7 depict examples of first-level branch predictor searching performed with and without SPRED 207, 407 of FIGS. 2 and 4 enabled. A normal search process 500 can be performed when SPRED 207, 407 is disabled. For embodiments that include accuracy counter 209, 409, while the accuracy counter 209, 409 is below an accuracy threshold, the BTB1 204, 404 can be examined from start search address 502 at offset 0 and continue with searching at offset 1 and offset 2 before reaching a default search depth 504. If no matches are found after reaching the default search depth 504, a miss is indicated which can result in further searching of the BTB2 206, 406. If the accuracy counter 209, 409 is above the accuracy threshold (or the accuracy counter 209, 409 is omitted), searching is performed across a search range bounded by an instruction address and a predicted stream length from SPRED 207, 407. The predicted stream length can extend beyond the default search depth 504 which prevents premature triggering of an unneeded search of the BTB2 206, 406, or the predicted stream length can be less than the default search depth 504 which can allow for early triggering of BTB2 206, 406 searching.

Figure 6:
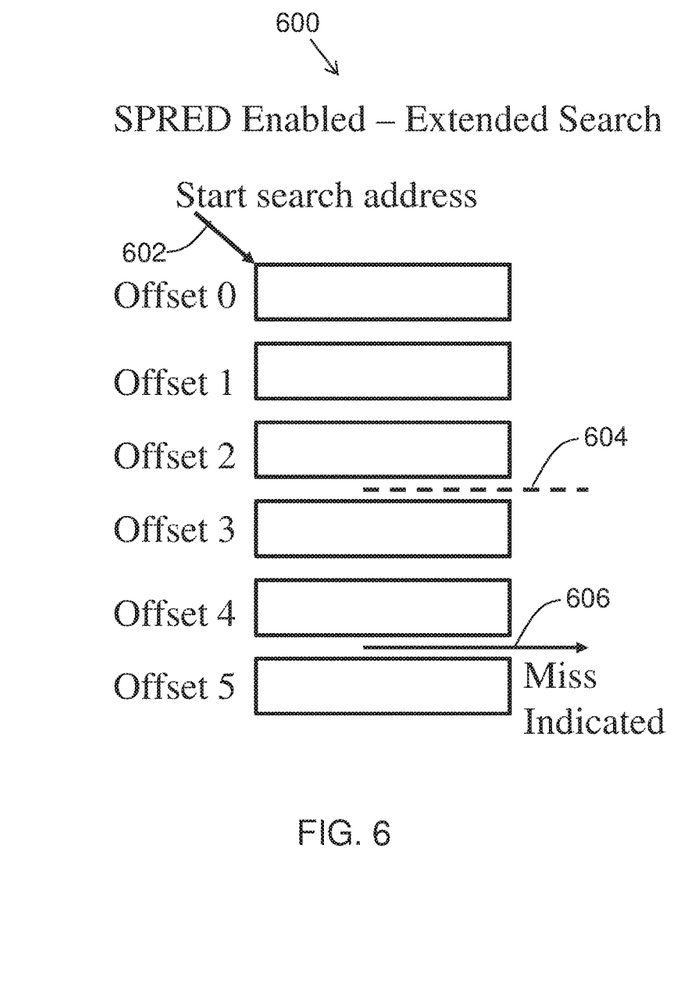
FIG. 6 depicts a branch predictor extended search in accordance with an embodiment.

Search process 600 is an example of a SPRED-enabled extended search. BTB1 204, 404 can be examined from start search address 602 at offset 0 and continue with searching at offset 1 and offset 2 before reaching a default search depth 604. Rather than declaring a miss, searching extends beyond the default search depth 604 to offsets 3 and 4 until reaching a predicted stream length 606 to indicate a miss. If a taken branch is located at offset 4 as predicted by SPRED 207, 407, then the accuracy counter 209, 409 can be incremented; otherwise, searching of BTB2 206, 406 may be triggered and the accuracy counter 209, 409 can be decremented.

Figure 7:
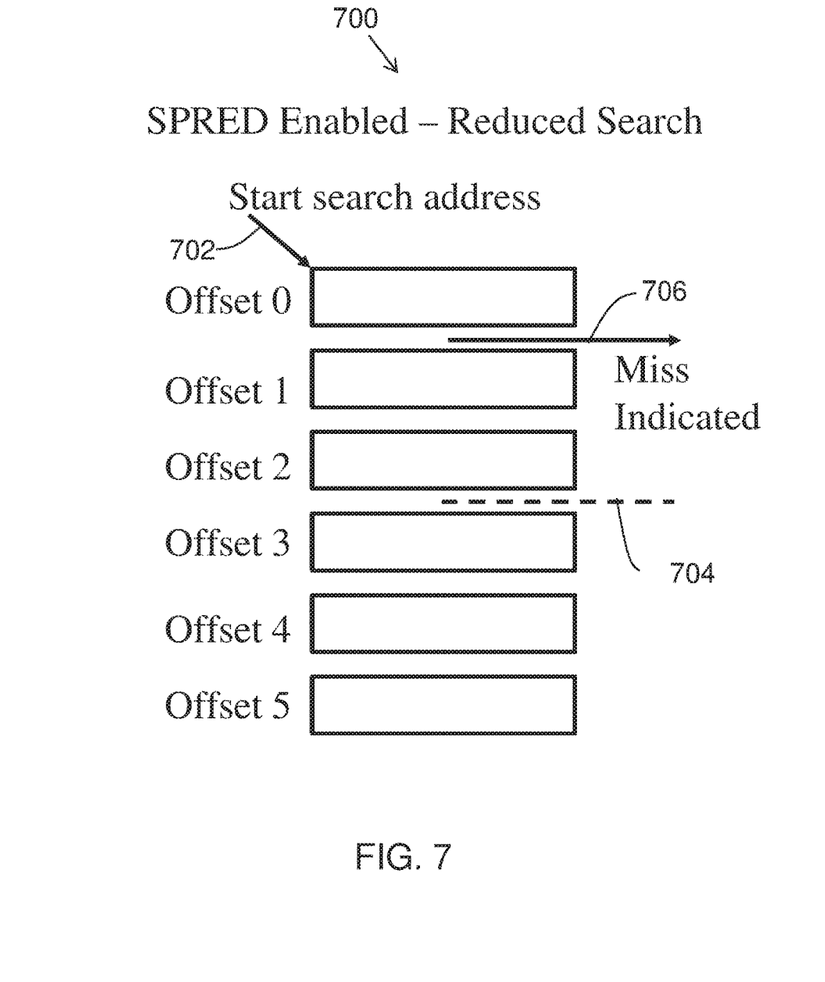
FIG. 7 depicts a branch predictor reduced search in accordance with an embodiment.

Search process 700 is an example of a SPRED-enabled reduced search. BTB1 204, 404 can be examined from start search address 702 at offset 0. Rather than continuing with searching at offset 1, and offset 2 before reaching a default search depth 704. A miss is indicated early prior to the default search depth 704 upon reaching offset 0 at predicted stream length 706. If a taken branch is located at offset 0 as predicted by SPRED 207, 407, then the accuracy counter 209, 409 can be incremented; otherwise, searching of BTB2 206, 406 may be triggered and the accuracy counter 209, 409 can be decremented.

Figure 8:
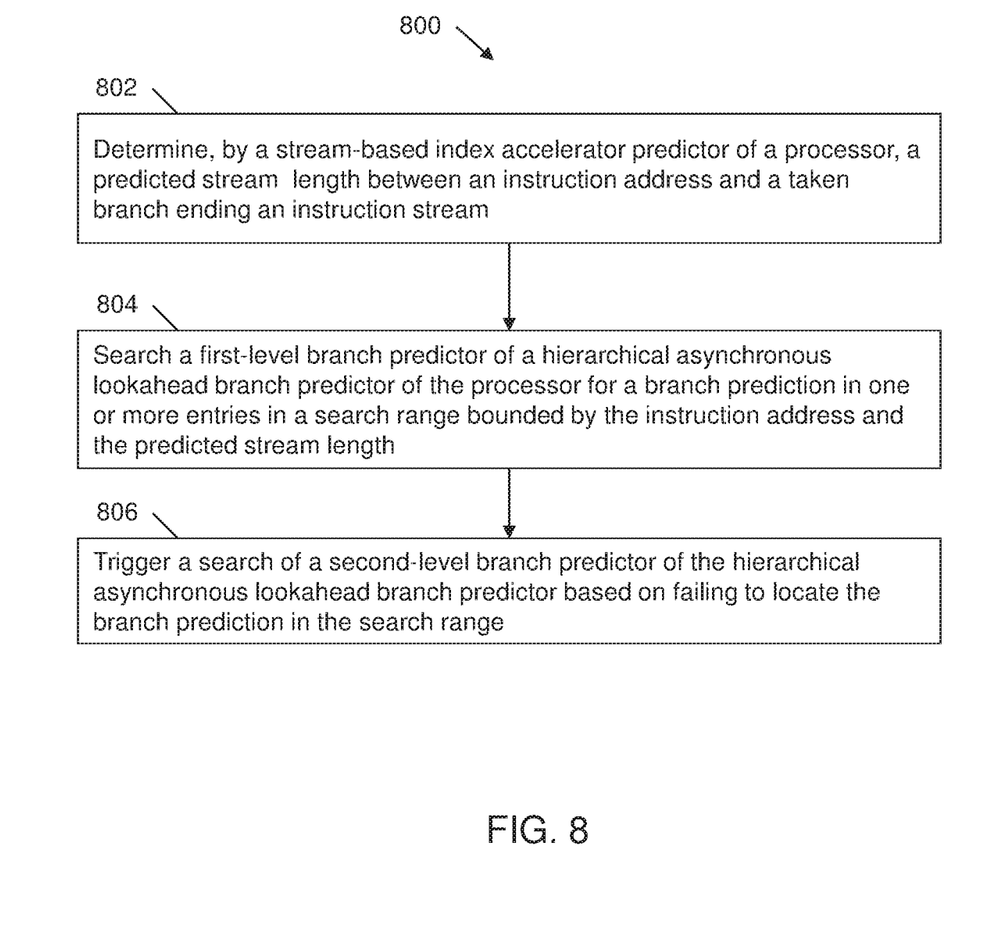
FIG. 8 is a flowchart depicting a computer-implemented method in accordance with an embodiment.

Turning now to FIG. 8, a process 800 for branch predictor search qualification using stream length prediction will now be described in an exemplary embodiment. The process 800 is described in reference to FIGS. 1-7 and can be implemented by the branch predictors 105 and index accelerator 107 of FIG. 1.

At block 802, SPRED 207, 407 of processor 104 determines a predicted stream length between an instruction address and a taken branch ending an instruction stream. At block 804, a first-level branch predictor (BTB1 204, 404 and/or BTP 403) of a hierarchical asynchronous lookahead branch predictor 205, 405 of the processor 104 searches for a branch prediction in one or more entries in a search range bounded by the instruction address and the predicted stream length.

At block 806, a search of a second-level branch predictor (BTB2 206, 406) of the hierarchical asynchronous lookahead branch predictor 205, 405 is triggered based on failing to locate the branch prediction in the search range. The triggering of a search can result in a bulk transfer of a plurality of branches from the BTB2 206, 406 to the BTB1 204, 404 and/or to the BTBP 403. The use of SPRED 207, 407 can extend searching of the BTB2 206, 406 beyond a default search depth (which may be further qualified with an instruction cache miss), as depicted in the example of FIGS. 2, 4, and 6. The SPRED 207, 407 can alternatively trigger searching of the BTB2 206, 406 prior to reaching the default search depth (which may be qualified with an instruction cache miss) as depicted in the example of FIGS. 2, 4, and 7.

As previously described, in some embodiments, accuracy counter 209, 409 can be updated based on a number of times that the SPRED 207, 407 correctly predicts the predicted stream length and the correct prediction is used. Use of the search range can be enabled based on determining that the accuracy counter 207, 407 is above an accuracy threshold. Use of the search range can be disabled, and use of a default search depth can be enabled based on determining that the accuracy counter 207, 407 is below the accuracy threshold.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

determining, by a stream-based index accelerator predictor of a processor, a predicted stream length between an instruction address and a taken branch ending an instruction stream of a plurality of instructions to be fetched from memory including the instruction address, the stream-based index accelerator predictor comprising a plurality of rows of branch prediction data, the stream-based index accelerator predictor tracking an index to one or more of the rows corresponding to the instruction address of a first instruction received in the instruction stream and an exit point as the taken branch ending the instruction stream;

searching a first-level branch predictor of a hierarchical asynchronous lookahead branch predictor of the processor for a branch prediction in one or more entries in a search range bounded by the instruction address and the predicted stream length, wherein the first-level branch predictor is configured to provide a predicted target address as the branch prediction responsive to the searching of the first-level branch predictor;

triggering a search of a second-level branch predictor of the hierarchical asynchronous lookahead branch predictor based on failing to locate the branch prediction in the search range, wherein the second-level branch predictor comprises a greater capacity to store the entries than the first-level branch predictor;

updating an accuracy counter based on a number of times that the stream-based index accelerator predictor correctly predicts the predicted stream length and the correct prediction is used;

enabling use of the search range to extend searching of the first-level branch predictor beyond a default search depth that triggers the search of the second-level branch predictor based on determining that the accuracy counter is above an accuracy threshold; and disabling use of the search range and enabling use of the default search depth based on determining that the accuracy counter is below the accuracy threshold.

2. The computer-implemented method of claim 1, wherein the first-level branch predictor comprises a branch target buffer and a branch target buffer preload table.

3. The computer-implemented method of claim 2, further comprising transferring a plurality of branches from the second-level branch predictor to the branch target buffer or the branch target buffer preload table based on the search of the second-level branch predictor.

4. The computer-implemented method of claim 1, wherein triggering the search of the second-level branch predictor of the hierarchical asynchronous lookahead branch predictor is performed prior to reaching a default search depth.

5. The computer-implemented method of claim 1, wherein the search of the second-level branch predictor of the hierarchical asynchronous lookahead branch predictor is extended beyond a default search depth.

6. A system comprising:
an accuracy counter;
a stream-based index accelerator predictor of a processor operable to determine a predicted stream length between an instruction address and a taken branch ending an instruction stream of a plurality of instructions to be fetched from memory including the instruction address, the stream-based index accelerator predictor comprising a plurality of rows of branch prediction data, the stream-based index accelerator predictor tracking an index to one or more of the rows corresponding to the instruction address of a first instruction received in the instruction stream and an exit point as the taken branch ending the instruction stream; and
a hierarchical asynchronous lookahead branch predictor of the processor comprising a first-level branch predictor and a second-level branch predictor, the hierarchical asynchronous lookahead branch predictor operable to:
search the first-level branch predictor for a branch prediction in one or more entries in a search range bounded by the instruction address and the predicted stream length, wherein the first-level branch predictor is configured to provide a predicted target address as the branch prediction responsive to the searching of the first-level branch predictor;
trigger a search of the second-level branch predictor based on failing to locate the branch prediction in the search range, wherein the second-level branch predictor comprises a greater capacity to store the entries than the first-level branch predictor,
update the accuracy counter based on a number of times that the stream-based index accelerator predictor correctly predicts the predicted stream length and the correct prediction is used;
enable use of the search range to extend searching of the first-level branch predictor beyond a default search depth that triggers the search of the second-level branch predictor based on determining that the accuracy counter is above an accuracy threshold; and
disable use of the search range and enabling use of the default search depth based on determining that the accuracy counter is below the accuracy threshold.

7. The system of claim 6, wherein the first-level branch predictor comprises a branch target buffer and a branch target buffer preload table.

8. The system of claim 7, wherein the hierarchical asynchronous lookahead branch predictor is operable to transfer a plurality of branches from the second-level branch predictor to the branch target buffer or the branch target buffer preload table based on the search of the second-level branch predictor.

9. The system of claim 6, wherein the search of the second-level branch predictor of the hierarchical asynchronous lookahead branch predictor is triggered prior to reaching a default search depth.

10. The system of claim 6, wherein the search of the second-level branch predictor of the hierarchical asynchronous lookahead branch predictor is extended beyond a default search depth.

11. A computer program product comprising a computer readable storage medium having program instructions embodied therewith, wherein the computer readable storage medium is not a transitory signal per se, the program instructions executable by a processor to cause the processor to perform a method comprising:
determining, by a stream-based index accelerator predictor of the processor, a predicted stream length between an instruction address and a taken branch ending an instruction stream of a plurality of instructions to be fetched from memory including the instruction address, the stream-based index accelerator predictor comprising a plurality of rows of branch prediction data, the stream-based index accelerator predictor tracking an index to one or more of the rows corresponding to the instruction address of a first instruction received in the instruction stream and an exit point as the taken branch ending the instruction stream;
searching a first-level branch predictor of a hierarchical asynchronous lookahead branch predictor of the processor for a branch prediction in one or more entries in a search range bounded by the instruction address and the predicted stream length, wherein the first-level branch predictor is configured to provide a predicted target address as the branch prediction responsive to the searching of the first-level branch predictor;
triggering a search of a second-level branch predictor of the hierarchical asynchronous lookahead branch predictor based on failing to locate the branch prediction in the search range, wherein the second-level branch predictor comprises a greater capacity to store the entries than the first-level branch predictor;
updating an accuracy counter based on a number of times that the stream-based index accelerator predictor correctly predicts the predicted stream length and the correct prediction is used;
enabling use of the search range to extend searching of the first-level branch predictor beyond a default search depth that triggers the search of the second-level branch predictor based on determining that the accuracy counter is above an accuracy threshold; and
disabling use of the search range and enabling use of the default search depth based on determining that the accuracy counter is below the accuracy threshold.

12. The computer program product of claim 11, wherein the first-level branch predictor comprises a branch target buffer and a branch target buffer preload table.

13. The computer program product of claim 12, wherein the program instructions further cause the processor to perform:

transferring a plurality of branches from the second-level branch predictor to the branch target buffer or the branch target buffer preload table based on the search of the second-level branch predictor.

14. The computer program product of claim 11, wherein triggering the search of the second-level branch predictor of the hierarchical asynchronous lookahead branch predictor is performed prior to reaching a default search depth.

15. The computer program product of claim 11, wherein the search of the second-level branch predictor of the hierarchical asynchronous lookahead branch predictor is extended beyond a default search depth.

* * * * *